United States Patent [19]

Bell

[11] Patent Number: 5,139,013
[45] Date of Patent: Aug. 18, 1992

[54] INDICATOR FOR ULTRASOUND TRANSDUCER

[76] Inventor: George L. Bell, 3196 Lilly Ave., Long Beach, Calif. 90808

[21] Appl. No.: 251,319

[22] Filed: Sep. 30, 1988

[51] Int. Cl.$^5$ ............................................. G01N 29/00
[52] U.S. Cl. ................................................. 128/24 AA
[58] Field of Search ............... 128/660.01, 24 A, 736

[56] References Cited

U.S. PATENT DOCUMENTS

| | | | |
|---|---|---|---|
| 4,323,077 | 4/1982 | Smith | 128/660.01 |
| 4,327,743 | 5/1982 | Katz | 128/736 |
| 4,333,477 | 6/1982 | Chervitz | 128/736 |
| 4,390,026 | 6/1983 | Christman | 128/660.01 |
| 4,433,637 | 2/1984 | Buirley et al. | 128/736 X |
| 4,437,471 | 3/1984 | Nelson | 128/736 |

Primary Examiner—Francis Jaworski

[57] ABSTRACT

A direct indicator which serves to verify before each use that the transducer used in ultrasound therapy is actually operational and is transmitting ultrasound radiation to the patient. The indicator includes a liquid crystal layer which changes color in the presence of ultrasound radiation when an active ultrasound transducer is held against the surface of the indicator. A transparent vinyl layer is positioned on top of the liquid crystal layer, the vinyl layer not only serving to protect the liquid crystal layer from surface heat, but also enabling the liquid crystal to store the color pattern produced by the transducer for a predetermined time duration, for example, while the transducer is in use, to remind the operator that the transducer has been verified.

4 Claims, 2 Drawing Sheets

INDICATOR FOR ULTRASOUND TRANSDUCER

BACKGROUND OF THE INVENTION

Ultrasound has been used as a therapeutic technique in physical medicine for many years. The technique is effective as an adjunctive therapy for the treatment of pain, soft tissue injury and joint dysfunction, including osteoarthritis, periarthritis, bursitis, tenosynovitis, and a number of musculoskeletal syndromes.

Ultrasonic therapy relies on mechanical vibration of tissues to cause thermal and other effects, using therapeutic frequencies of, for example, 1 MHz or 3 MHz, respectively. The electrical output from the ultrasonic generator is converted into mechanical vibration through a transducer generally made of crystalline material such as lead zirconate titanate or other synthetic or natural crystals. The ultrasonic output may be continuous wave or pulsed depending on the therapeutic indication. The ultrasonic energy is transferred to the tissue of the patient by means of a coupling medium such as ultrasonic gel or water. Output intensities of 0.1-3 watts/cm$^2$ are typically used in therapeutic applications.

A problem encountered in ultrasound therapy is the difficulty of verifying that the transducer is actually operational during the procedure. Indicators on the ultrasonic generator serve only as an indirect means for informing the operator that the transducer is apparently energized. However, such indicators do not positively demonstrate that the transducer is actually emitting the ultrasound radiation.

The present invention provides a convenient indicator unit which contains a liquid crystal layer. The liquid crystal layer produces a definite color pattern when an active ultrasound transducer is brought in contact with the upper surface of the indicator unit. The unit is constructed so that this color pattern persists for a substantial time interval while the transducer is in use.

Liquid crystals were first discovered about 100 years ago. These crystals are organic compounds derived from cholesterol which exhibit both the flow properties of a liquid and the optical properties of a crystal. Specifically, liquid crystals have the property of scattering light selectively. As liquid crystals are warmed, bright reds, yellows, greens, blues and violet colors appear. Upon cooling, the colors reverse. Liquid crystals became a commercial practicality about 30 years ago when a room temperature mesophase compound was synthesized. This led to the formulation of liquid crystals with a wide variety of temperature ranges.

SUMMARY OF THE INVENTION

The present invention provides an indicator unit which serves as a direct means for verifying that the transducer used, for example, in ultrasound therapy, is actually operational and is emitting ultrasound radiation during such use. The indicator unit of the invention includes a light crystal layer which changes color in the presence of ultrasound radiation, and a transparent vinyl layer mounted on top of the liquid crystal layer. The vinyl layer serves to protect the liquid crystal layer from surface heat, and also enables the liquid crystal layer to store color patterns for a significant time duration. The transducer is tested by pressing it down on the top of the vinyl layer, and by using, for example, a gel to provide a coupling medium between the transducer and the interior of the unit. If the transducer is operational, a distinct color pattern will appear on the liquid crystal layer, which will be visible through the transparent vinyl layer after the transducer has been removed. The resulting color pattern will persist for a substantial time interval while the transducer is in use, reminding the operator that the operational state of the transducer has been verified.

DETAILED DESCRIPTION OF THE ILLUSTRATED EMBODIMENT

Figure 1:
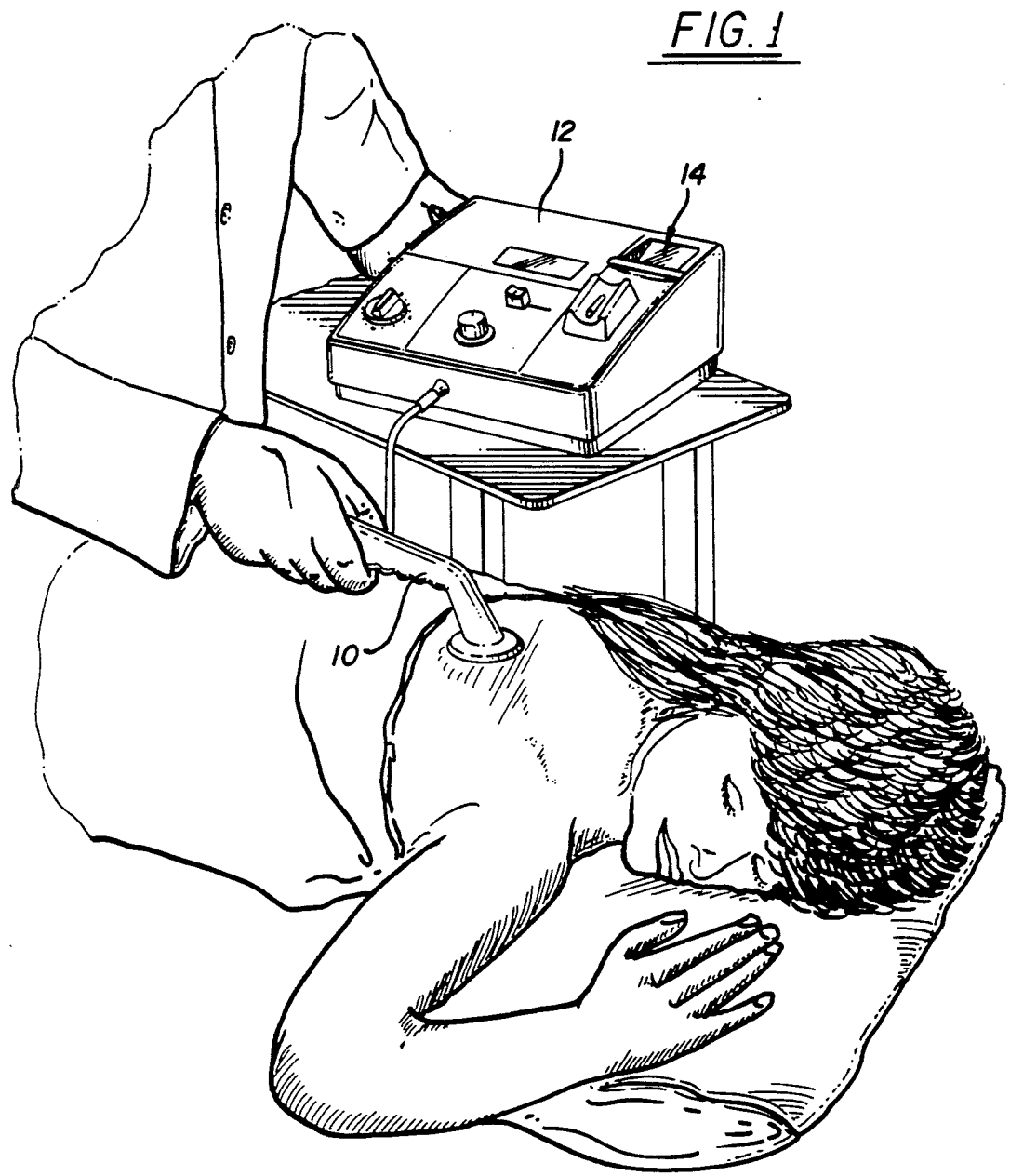
FIG. 1 is a perspective view of a typical ultrasonic generator and also showing an ultrasound transducer plugged into the generator and used in conjunction with a patient for therapeutic purposes.

As shown in FIG. 1, an ultrasound transducer 10 is plugged into a typical ultrasonic generator 12, and is used for therapeutic purposes on a patient, as shown.

An indicator 14 is mounted directly on the unit 10, or it may be mounted on a table or desk adjacent to the unit, if so desired.

In accordance with the present invention, prior to each use, the head of the ultrasound transducer 10 is placed on the surface of the indicator unit 14, and appropriate gel may be used to couple the head to the interior of the indicator unit.

If the ultrasound transducer 10 is operating properly, a distinctive color pattern will appear in the unit, and that color pattern will persist for a predetermined time interval to remind the operator that the ultrasound transducer has been verified and is operational.

Figure 3:
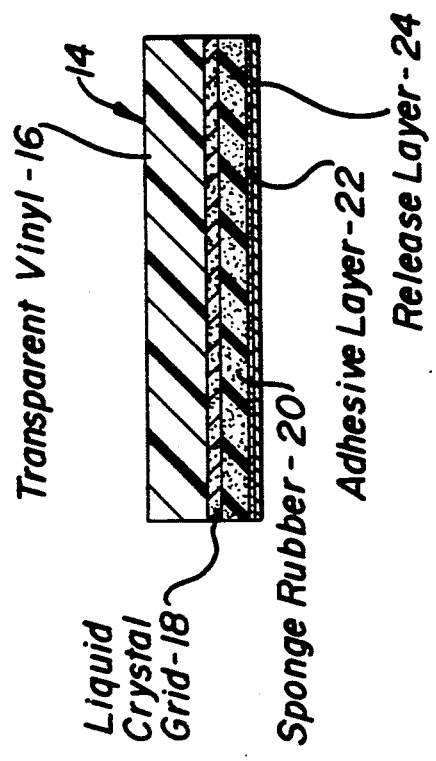
FIG. 3 is a cross-section of the indicator unit of FIG. 2 taken along the line 3—3 of FIG. 2.
Figure 2:
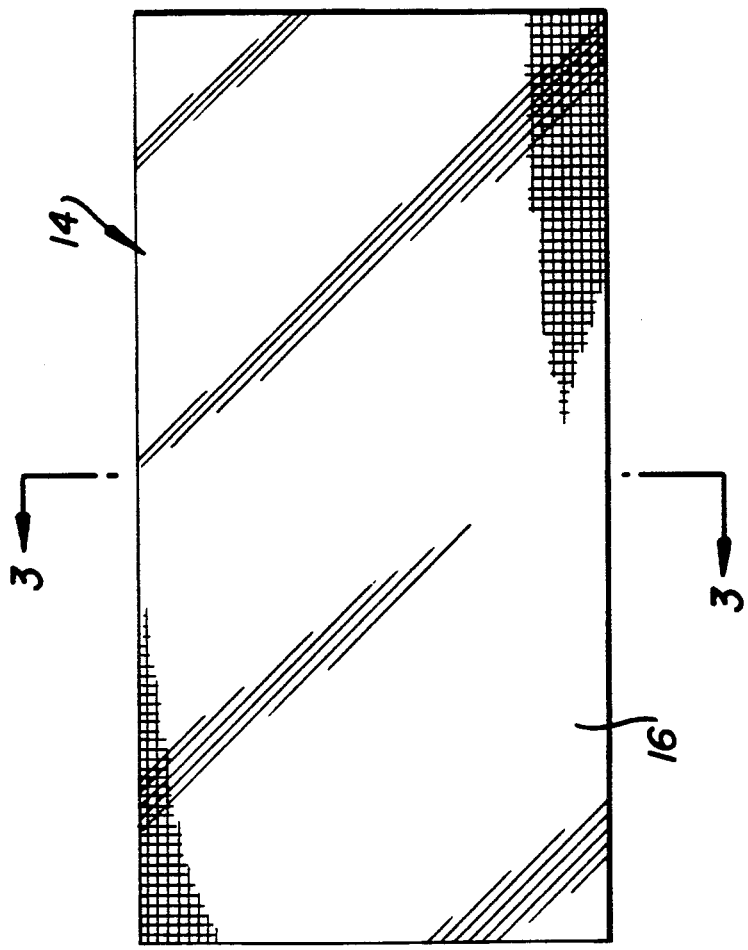
FIG. 2 is a top plan view of an indicator unit constructed in accordance with the concepts of the invention.

As shown in FIG. 3, the indicator unit 14 includes a top member 16 which may be a rigid piece of a transparent vinyl plastic, or other appropriate material. Underneath the member 16 is a liquid crystal member 18 which has the characteristics described above of responding to ultrasound radiation from the head of transducer 10 to form a distinctive color pattern. The liquid crystal member 18 may take the form of a liquid crystal grid. Under the liquid crystal grid there is provided a layer or member 20 formed of resilient material such as sponge rubber or foam plastic.

The member 20 serves as a base for the indicator unit, and also serves as a heat shield for surface temperatures from objects on which the indicator unit is mounted. An adhesive layer 22 is formed on the underside of the resilient layer 20. The adhesive layer 22 may be formed of a pressure-sensitive adhesive, so that the indicator unit may be quickly attached to the generator 12 of FIG. 1, or to any other appropriate supporting surface, and so that it may also be readily removed for replacement of other purposes. A release layer 24 is provided on the adhesive layer 22, and which is removed when the unit is to be mounted.

The transparent vinyl member 16 acts as a barrier against surface heat conditions, so that the liquid crystal grid 18 responds only to ultrasound radiation from the head of transducer 10. The vinyl member also serves as a heat barrier so as to retain the color pattern in the liquid crystal grid for a predetermined time after the transducer 10 has been removed. This time may be of the order, for example, of 10 minutes, enabling the operator to be reminded during the use of the transducer 10 that prior to use it had been verified.

It will be appreciated that while a particular embodiment of the invention has been shown and described, modifications may be made. It is intended in the claims to cover all modifications which come within the spirit and scope of the invention.

I claim:

1. An indicator unit for verifying that an ultrasound transducer is producing an ultrasoundoutput, said ultrasound transducer being constructed to be placed over the skin of a patient in a particular treatment area, and said indicator unit being constructed to be attached to a supporting surface remote from the treatment area, said unit comprising: a rigid light transparent layer through which the ultrasound output from an active ultrasound transducer is transmitted; a liquid crystal layer attached to and positioned under the transparent layer and responsive to the ultrasound output from the ultrasound transducer transmitted through said transparent layer to provide a distinct color pattern which remains visible through said transparent layer for a predetermined interval; and a heat insulator layer attached to and positioned on the opposite side of said liquid crystal layer.

2. The indicator unit defined in claim 1, in which said transparent layer is formed of a rigid vinyl plastic material.

3. The indicator unit defined in claim 1, in which said heat insulator layer is formed of a resilient material.

4. The indicator unit defined in claim 1, and which includes a pressure-sensitive adhesive formed on the opposite surface of said heat insulator layer.

* * * * *